United States Patent [19]

Carleson

[11] 3,835,411

[45] Sept. 10, 1974

[54] ADJUSTABLE EQUALIZING NETWORK

[75] Inventor: Bengt Jonas Timoteus Carleson, Stockholm, Sweden

[73] Assignee: Telefonaktiebolaget L M Ericsson, Stockholm, Sweden

[22] Filed: Aug. 4, 1972

[21] Appl. No.: 277,891

[30] Foreign Application Priority Data

Aug. 27, 1971 Sweden .......................... 10911/71

[52] U.S. Cl. .......................... 330/31, 330/176
[51] Int. Cl. .......................... H03f 3/04
[58] Field of Search .......................... 330/31, 109

[56] References Cited

UNITED STATES PATENTS 3,419,812 12/1968 Barditch et al. .................. 330/31 X
3,436,675 4/1969 Lunau .................. 330/109 X
3,509,482 4/1970 Guillemin .................. 330/109 X

*Primary Examiner*—Nathan Kaufman
*Attorney, Agent, or Firm*—Hane, Baxley & Spiecens

[57] ABSTRACT

The invention relates to an adjustable equalizing network that is principally suited for use in the transmission of carrier wave telephone signals through a coaxial cable. While heretofore known equalizing networks comprise T-type networks with inverse frequency dependent impedances in their shunt and series branches respectively, the equalizing network of the invention comprises a T-type network in which the series branch includes only resistive elements and the shunt branch alone is provided with a frequency dependent impedance.

6 Claims, 4 Drawing Figures

PATENTED SEP 10 1974 3,835,411

ADJUSTABLE EQUALIZING NETWORK

Figures 1, 2, 3, 4:
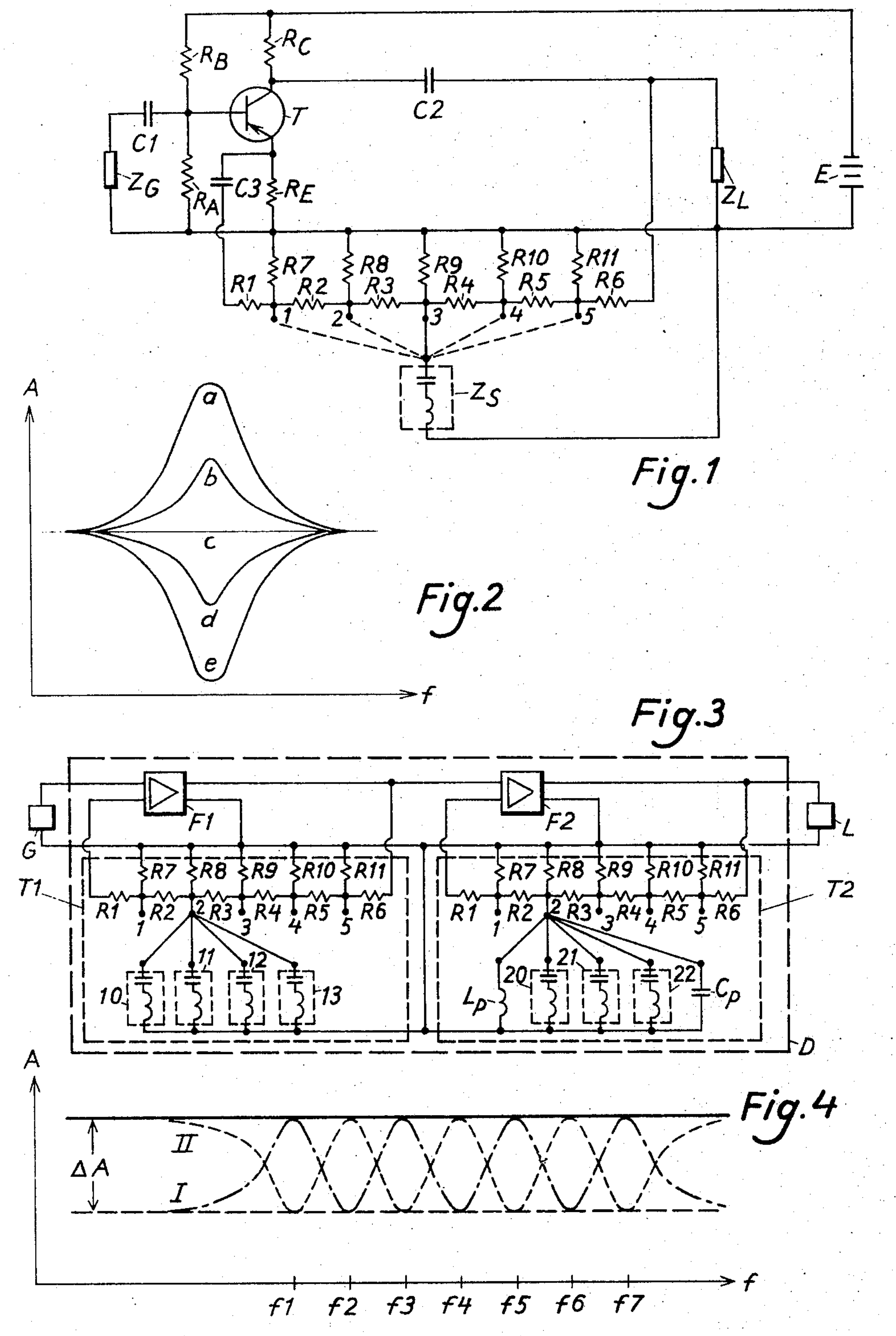

The invention relates to an adjustable equalizing network comprising a reactive T-type network and a four-polar signal amplifier. The equalizing network is principally suited for use in the transmission of carrier wave telephone signals through a coaxial cable.

A frequency dependent attenuation in a transmitted frequency band can in principle be compensated or equalized by the addition of a so-called complementary attenuation so that the total attenuation by definition becomes constant within the frequency band. This method is used for many years in the transmission of carrier-wave telephone signals through a coaxial cable in order to equalize such deviations from a predetermined attenuation characteristic that arise at the end of long transmission paths in which a large number of repeater sections are employed. These deviations arise inevitably due to the fact that a large number of cascade connected repeater sections along the transmission path can provide cumulative equalization errors of a considerable magnitude even when the equalization errors of the individual repeater sections are kept low.

Heretofore the required complementary attenuations for the equalization of negative as well as positive deviations relatively a predetermined attenuation characteristic have been achieved by means of adjustable equalizing networks comprising T-type networks with inverse frequency dependent impedances in their shunt- and series branches respectively and one or several signal amplifier stages. The principle for these equalizing networks is described more in detail in the U.S. Pat. No. 2,096,027.

The adjustable equalizing network according to the invention renders as the heretofore known equalizing networks an equalization of negative as well as positive attenuation deviations but achieves this by means of a T-type network in which the series branch comprises only resistive elements and the shunt branch alone comprises a frequency dependent impedance. According to the invention the desired result in thus provided with fewer frequency dependent impedances. Since frequency dependent impedances of the requisite kind are expensive circuit components it should be possible to manufacture the adjustable equalizing network of the invention at a lower cost than the heretofore known adjustable equalizing networks.

The characteristics of the invention appear from the appended claims.

The invention is explained more in detail below with reference to accompanying drawing, in which FIG. 1 shows a circuit diagram of an adjustable equalizing network according to the invention, FIG. 2 shows some frequency response characteristics for the equalizing network according to FIG. 1, FIG. 3 shows a circuit diagram of a prefered embodiment of an adjustable equalizing network according to the invention and FIG. 4 shows in diagram form how the equalizing network according to FIG. 3 achieves a frequency response characteristic which according to the example is constant within the transmission band.

FIG. 1 shows a circuit diagram of an adjustable equalizing network which is designed according to the principle of the invention and is to be connected in cascade with a not shown carrier wave telephone signal transmission line. The equalizing network is shown as connected to a signal source G, represented by generator impedance $Z_G$ and a load L represented by load impedance $Z_L$ that are defined by said transmission line.

The equalizing network according to FIG. 1 is essentially built up of on the one hand with a reactive T-type network in which the series branch consists of a number of resistive elements R1–R6 and the shunt branch consists of a series resonant circuit $Z_S$, and on the other hand a common-emitter-coupled transistor amplifier stage with a transistor T and an emitter resistor $R_E$. The transistor amplifier stage includes furthermore a collector resistor $R_C$, a D.C. voltage source E, two resistors $R_A$ and $R_B$ which form a potential divider to set the base potential and thus the operating point for the transistor T, and two coupling capacitors C1 and C2 for the input signal and the output signal respectively of the transistor T.

The T-type network is connected to the common-emitter-coupled transistor amplifier stage in such a manner that its series branch is connected between the collector and emitter of the transistor T via said capacitor C2 and via a further capacitor C3 respectively while its shunt branch is connected between the ground of the amplifier stage and alternative tappings 1–5 of the series branch. By these means the respective terminal impedances of the transistor T and of the T-type network are connected in series to the signal source G and in parallel to the load L respectively, so that the two in principle four-polar elements are according to established terminology from the signal point of view connected in series-parallel.

The gain A of the equalizing network as expressed in neper can, if the influences of the T-type network, the generator impedance $Z_G$ and the load impedance $Z_L$ are neglected, approximately be calculated from the formula $e^A = R_C/R_E$. Thus it should clearly be apparent that the equalizing network can at will be given an additional attenuation or gain by connecting the resistor $R_C$ or the resistor $R_E$ respectively to an adjustable load, which if the same is frequency dependent will force its own characteristic or its inverse characteristic respectively upon the characteristic of the equalizing network. Such an adjustable load is according to the principle of the invention achieved by means of the T-type network by that its shunt branch is optionally connectable to tappings 1–5 of the series branch and thus can be connected for principally loading either the resistor $R_C$ or the resistor $R_E$.

FIG. 2 shows some frequency response characteristics for the equalizing network in FIG. 1 with the shunt branch of the T-type network being connected to different tappings of the series branch, the curve *a* corresponding to the tapping 1, the curve *b* to the tapping 2, the curve *c* to the tapping 3, the curve *d* to the tapping 4 and the curve *e* to the tapping 5. The tapping 3 constitutes a neutral tapping alternative with respect to the influence of the T-type network on the gain A of the equalization network.

It is desirable that the form of the characteristics is the same for different amplitudes at gain equalization as well as at attenuation equalization. This can be realized by providing the tappings 1–5 of the series branch of the T-type network with such shunt branches of resistive elements R7–R11 that these together with the resistive elements R1–R6 will form a not terminated resistive $\pi$-network where the tappings 1–5 have image impedances of substantially the same size. The image attenuation of the $\pi$-network shall be so large that the tapping 3 will constitute a well defined neutral tapping alternative with respect to the influence of the series resonant circuit $Z_S$ on the gain A of the equalizing network.

The transistor amplifier stage is provided with two types of feed-back, on the one hand a negative feedback owing to the fact that the emitter resistor $R_E$ is not by-passed and on the other hand a positive feed-back that is achieved via the resistive elements R1-R6 in the common series branch of the T-type network and the $\pi$-network. The positive feed-back is, however, weak and is limited by the image attenuation of the $\pi$-network.

FIG. 3 shows a circuit diagram of a prefered embodiment of an adjustable equalizing network D according to the invention by means of which deviations from a predetermined attenuation characteristic can be equalized over a broad frequency band. The equalizing network D consists of two separate equalizing networks which are designed according to the principle of the invention and which are connected in cascade between a signal source G and a load L and consist of an amplifier element F1 in a series-parallel connection with a T-type network T1 and an amplifier element F2 in a series-parallel connection with a T-type network T2 respectively. The respective circuit diagram of the amplifier elements F1 and F2 are assumed to be similar to the circuit diagram for the transistor amplifier stage in FIG. 1. The structure of the T-type networks T1 and T2 is principally the same as in FIG. 1 but has been modified so far that their respective shunt branches consist of 4 parallel connected series resonant circuits 10, 11, 12 and 13 and of 3 parallel connected series resonant circuits 20, 21 and 22 respectively, and that the shunt branch of the T-type network T2 includes an inductor $L_p$ and a capacitor $C_p$, which form a parallel resonant circuit.

FIG. 4 shows how the equalizing network D achieves a frequency response characteristic which according to the example is constant within the transmission band. The curve I shows the influence of the T-type network T1 of the amplifier element F1 on the total gain of the equalizing network D, the frequencies $f1, f3, f5$ and $f7$ being series resonant frequencies and the frequencies $f2, f4$ and $f6$ being the parallel resonant frequencies for the parallelly connected series resonant circuits 10, 11, 12 and 13. A relatively the characteristic I inverse frequency response shows the characteristic II, which relates to the influence of the T-network T2 of the amplifier element F2 on the total gain of the equalizing network D. The frequencies $f2, f4$ and $f6$ are here the series resonant frequencies for series resonant circuits 20, 21 and 22 respectively and the frequency $f4$ is furthermore the parallel resonant frequency for the parallel resonant circuit consisting of the coil $L_p$ and the capacitor $C_p$. Parallel resonance is furthermore achieved at the frequencies $f1, f3, f5$ and $f7$. The T-type networks T1 and T2 have their shunt branches connected to a tapping 2 of their respective series branches which tapping 2 renders the respective gain of the amplifier elements F1 and F2 a maximum value at the frequencies $f1, f3, f5$ and $f7$ and at the frequencies $f2, f4$ and $f6$ respectively. When the frequency decreases below the transmission band the reactance of the coil L decreases with the result that the contribution of the amplifier element T2 to the total gain of the equalizing network D increases. The same result is obtained when the frequency increases above the transmission band by that the reactance of the capacitor $C_p$ then decreases.

Series resonant frequencies $f1, f2, f3, f4, f5, f6$ and $f7$ are chosen so that characteristics of the series resonant circuits 10, 11, 12 and 13 and of the series resonant circuits 20, 22, 23 respectively intersect each other at the half-width as appears from FIG. 4. Within the transmission band the equalizing network D in FIG. 3 with T-type networks T1 and T2 as shown obtains a characteristic with constant frequency response and a gain contribution $\Delta A$. It is easy to see that by chosing mutually independent connections of the series resonant circuits 10, 11, 12, 13, 20, 21 and 22 and of the inductor $L_p$ and the capacitor $C_p$ to the tappings 1–5 of the T-type networks T1 and T2 frequency response characteristics with varying forms can be obtained for equalizing positive as well as negative attenuation deviations of a limited amplitude.

The invention is not limited to the above described embodiments. For example the common-emitter-coupled transistor amplifier stage shown in FIG. 1 can obtain an improved function if the single transistor T is substituted by two transistors in a so-called Darlington-pair-connection. Furthermore, of course the structure of the T-type network shown in FIG. 1 can be varied and for example in principle be replaced by the series resonant circuit $Z_s$ in combination with a potentiometer, in which case alternative settings of the potentiometer will correspond to the tappings 1–5 in FIG. 1.

In FIG. 3 the inductance elements of all the series resonant circuits 10, 11, 12, 13, 20, 21 and 22 have one of their terminals connected to ground. This fact makes them easy to replace with active RC-filters, for example in form of so-called gyrators.

The invention is not limited to an equalizing network for the exclusive use in the transmission of carrier wave telephone signals through a coaxial cable.

The equalizing network of the invention is certainly specially suited for that use but it can also have many other applications in which an arbitrarily adjustable frequency response characteristic is desirable and which requires few frequency dependent impedances as compared with other equalizing networks.

We claim:

1. An adjustable equalizer system comprising at least one adjustable equalizer network, said adjustable equalizer network comprising: a signal source for transmitting signals; a signal load for receiving signals; a reference potential bus; an amplifier having first and second input terminals and first and second output terminals; means for connecting said input means between a first terminal of said amplifier and said reference potential bus; means for connecting said reference potential bus to the second output terminal of said amplifier; means for connecting said output means between the first output terminal of said amplifier and said reference potential bus; a T-type network having a series branch of only first resistive elements having first and second terminals, and a reactive shunt branch having one end connected between a selected point along said series branch and said reference potential bus; means for connecting a first terminal of said series branch to the second input terminal of said amplifier; and means for connecting the second terminal of said series branch to the first output terminal of said amplifier.

2. The adjustable equalizer system of claim 1 wherein said amplifier includes a transistor amplifier having a collector resistor and an unbypassed emitter resistor, said unbypassed emitter resistor being connected between said reference potential bus and the first terminal of said series branch, and said collector resistor being connected A.C. signalwise between said reference potential bus and the second terminal of said series branch.

3. The adjustable equalizer system of claim 1 wherein said shunt branch of said T-type network includes a series resonant circuit.

4. The adjustable equalizer system of claim 1 wherein each of a plurality of further resistive elements connects a different one of the junctions of said first resistive elements to a common point whereby said first and further resistive elements form an unterminated resistive $\pi$-network.

5. The adjustable equalizer system of claim 1 wherein said shunt branch comprises a plurality of different series resonant circuits, each of said circuits having a first end connected in common with said other series resonant circuits and a second end connected to a different point along said series branch.

6. The adjustable equalizer system of claim 1 further comprising a second adjustable equalizing network similar to said one adjustable equalizing network, means for connecting said adjustable equalizing networks in cascade with the shunt branches of their T-type networks in parallel, the parameters of the reactive elements in said shunt branches being so chosen that the branches have mutually inverse impedances.

* * * * *